(No Model.) 2 Sheets—Sheet 1.
J. A. MENGEL.
ICE HARVESTING MACHINE.
No. 432,421. Patented July 15, 1890.
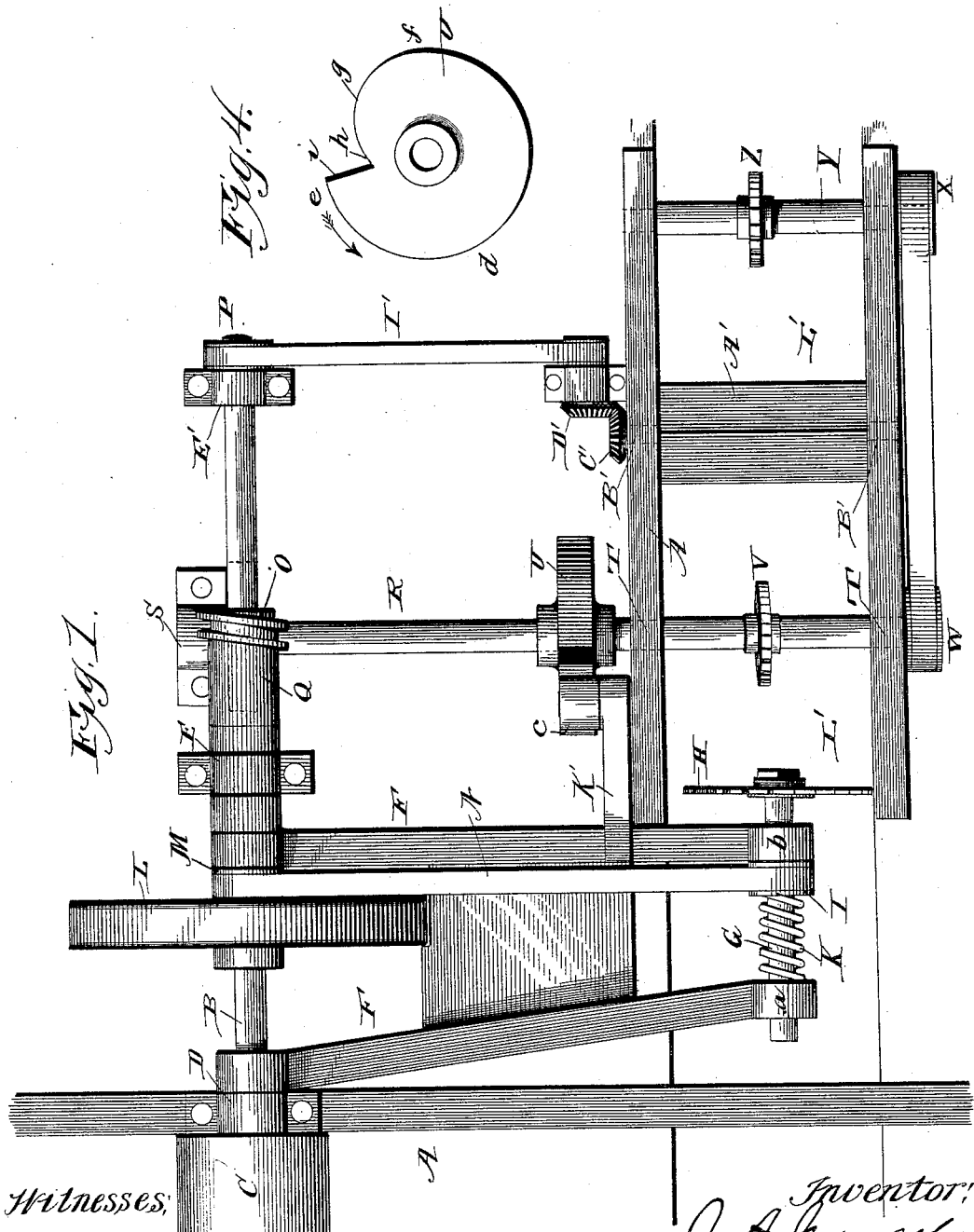
Witnesses:
Geo. J. Thorpe.
G. M. Copenhaver.
Inventor:
J. A. Mengel
By Johnston, Reinohl
& Dyer
Attorneys.

(No Model.) 2 Sheets—Sheet 2.
J. A. MENGEL.
ICE HARVESTING MACHINE.
No. 432,421. Patented July 15, 1890.
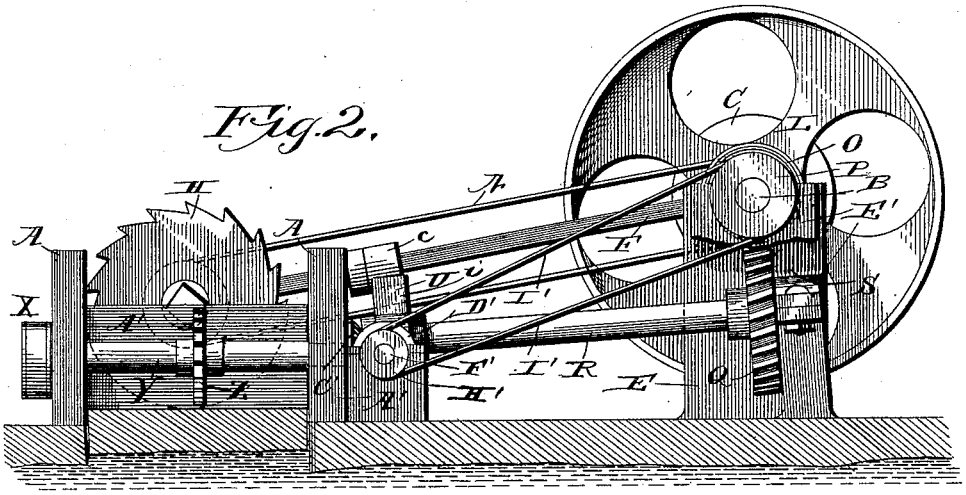
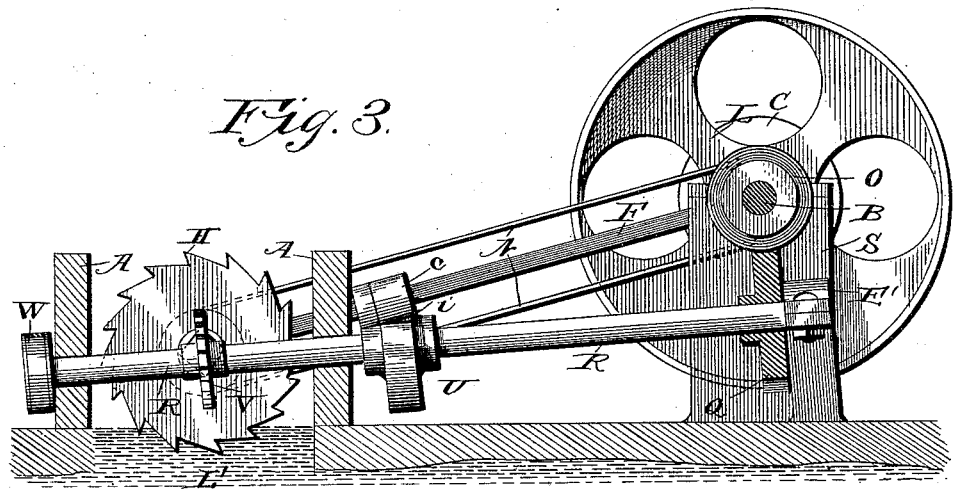

UNITED STATES PATENT OFFICE.

JOSEPH A. MENGEL, OF McKEANSBURG, PENNSYLVANIA.

ICE-HARVESTING MACHINE.

SPECIFICATION forming part of Letters Patent No. 432,421, dated July 15, 1890.

Application filed December 12, 1889. Serial No. 333,449. (No model.)

*To all whom it may concern:*

Be it known that I, JOSEPH A. MENGEL, a citizen of the United States, residing at McKeansburg, in the county of Schuylkill and State of Pennsylvania, have invented certain new and useful Improvements in Ice-Harvesting Machines; and I do hereby declare the following to be a full, clear, and exact description of the invention, such as will enable others skilled in the art to which it appertains to make and use the same.

My invention relates to machinery for harvesting ice, and has for its object certain improvements in the construction of such machinery whereby the snow which may have accumulated and frozen on the surface of the ice may be effectually removed and the ice cut into blocks or pieces of suitable length for convenience in handling, shipping, and transporting, or packing in ice-houses.

The invention will be hereinafter described, and particularly pointed out in the claims.

In the accompanying drawings, which form part of this specification, Figure 1 represents a plan view of my machine; Fig. 2, an end view showing the saw raised; Fig. 3, a transverse section showing the saw down, and Fig. 4 a detail of the cam for operating the frame which supports the saw.

Reference being had to the drawings and the letters thereon, A indicates a frame upon which the machine is supported, and which is designed to be placed upon the ice at a given point in a lake, pond, or other body of water from which it is desired to harvest ice.

B is a shaft, at one end of which is secured a main driving-pulley C, to be operated by a belt (not shown) connected to any suitable motor, preferably a portable steam-engine. The shaft B is supported in bearings D, E, and E', and has secured thereto a swinging frame F, which moves vertically upon said shaft, and in the free ends of the frame is supported a shaft G in bearings $a\ b$, and to one end of said shaft is secured a cutting-tool, which may be a circular saw H, as shown, or a tool with a knife-edge to sever the ice by blows produced by the fall of the frame and the cutting-tool. Upon said shaft G is also a pulley I and a spiral spring K, wound around the shaft between the pulley I and the bearing $a$ on the frame. The shaft B also supports a balance-wheel L, a pulley M, from which power is transmitted to the pulley I by a belt N for operating the saw, a worm gear-wheel O, and a pulley P. The worm-gear O engages with a gear-wheel Q, secured to the shaft R, which rests in suitable bearings S T and supports a cam U, a toothed feed-wheel V, and a pulley W, from which power is transmitted to a pulley X, secured to a shaft Y, which supports another feed-wheel Z.

In the frame, and in front of the cutting-tool H, is mounted a rotary planer A', to one end of the shaft B' of which is secured a bevel gear-wheel C', which engages with a corresponding gear-wheel D', secured to one end of a shaft F', which is supported in a bearing G', and has a pulley H', secured to its opposite end, to which power is transmitted from the pulley P on the shaft B by means of a belt I' for operating the rotary planer A'.

From the frame F projects an arm K', which is provided with an anti-friction roller $c$, which bears upon the periphery of the cam U, by which the frame and the saw H are lowered as the saw is cutting through the ice, and raised again to allow the ice to be moved under the saw a suitable distance preparatory to making another cut through the ice.

The cam U is provided with a portion $d$ on its periphery, which is concentric to the shaft R from the point $e$ to $f$, which holds the frame and the saw out of contact with the ice until said concentric portion $d$ has passed under the arm K', when the eccentric portion $g$ will have been reached, and the saw descends through the ice and reaches its lowest point when the arm R has reached the lowest point $h$ on the cam. The saw is then raised suddenly by the shoulder or projection $i$ coming in contact with the arm R and lifting the frame F and the saw out of engagement with the ice.

L' indicates a channel cut in the body of the ice being harvested, and through which slabs of ice cut to a predetermined width are conducted to the planer A' and to the saw H, and fed to both of said implements automatically by means of the feed-wheels V and Z, both of which wheels are secured to their respective shafts over the channel L'. The length of the pieces of ice cut is regulated by the diameter of the feed-wheels and the length of the concentric portion $d$ of the cam U, and the continuous motion of the ice through the channel L' is provided for by allowing the shaft G and the saw H to move laterally in the direction of the moving ice while the saw is cutting through the ice. This lateral movement of the shaft G compresses the spring K between the pulley I and the bearing $a$, and as soon as the saw is raised out of contact with the ice the resiliency of the spring restores the saw to its normal position.

In the operation of my machine the planer is used only when the ice to be harvested has a snowy surface, which should be removed before storing the ice. The ice in slabs is pushed along the channel L' by suitable implements until it reaches the feed-wheels, when it will be conducted through the machine automatically.

By the construction shown ice may be cleaned and cut into any desired length suitable for storing or convenient for transportation.

Having thus fully described my invention, what I claim is—

1. In an ice-harvesting machine, the combination of a stationary frame adapted to span a channel in the ice, a main driving-shaft, a swinging frame secured to said shaft and extending transversely across the machine within the stationary frame, a cutting-tool for severing the ice transversely into sections and attached to the free ends of the swinging frame, and a cam automatically operated from the main shaft for lowering and raising the cutting-tool, substantially as described.

2. In an ice-harvesting machine, the combination of a stationary frame adapted to span a channel in the ice, a main driving-shaft, a swinging frame secured to said shaft, a cutting-tool for severing the ice transversely into sections and supported in the free end of said frame, a shaft at an angle to the main shaft, operated therefrom and supporting a cam, and an arm projecting from the swinging frame and engaging with the cam, substantially as described.

3. In an ice-harvesting machine, the combination of a stationary frame, a main driving-shaft, a swinging frame secured to said shaft, a cutting-tool for severing the ice transversely into sections and supported in the free end of said swinging frame upon a laterally-movable shaft, an automatically-operated cam for lowering and raising the cutting-tool, and a feeder operated from the main shaft for moving the strip of ice in a channel to the cutting-tool, substantially as described.

4. In an ice-harvesting machine, the combination of a stationary frame, a driving-shaft, a cutting-tool for severing the ice transversely into sections, a cam for automatically lowering and raising the cutting-tool, and a feeder for moving the ice toward the tool, both operated by said main shaft and constructed to regulate or determine the length of the sections, substantially as described.

5. In an ice-harvesting machine, the combination of a stationary frame adapted to span a channel in the ice, a driving-shaft, a swinging frame secured to said shaft, a cutting-tool for severing the ice transversely into sections and supported in said frame, a cam for automatically lowering and raising the cutting-tool, having a shoulder or projection, an arm extending from the frame and engaging with the cam, and a feeder operated synchronously with the cam, substantially as described.

6. In an ice-harvesting machine, the combination of a stationary frame, a main driving-shaft, a swinging frame secured to said shaft and extending transversely across the machine within the stationary frame, a cutting-tool for severing the previously-cut strips transversely into sections and supported on said swinging frame, a shaft arranged at an angle to and operated by the main shaft, a cam for automatically lowering and raising the cutting-tool, having a portion of its working-surface concentric and a portion eccentric to the axis thereof, a shoulder or projection on said cam, and an arm extending from the swinging frame and engaging with said cam, substantially as described.

7. In an ice-harvesting machine, the combination of a stationary frame, a driving-shaft, a rotary planer for cleaning the ice, a cutting-tool for severing it transversely into sections, and a feeder operated from the main shaft for moving the strips of ice in a channel toward the planer, substantially as described.

8. In an ice-harvesting machine, the combination of a stationary frame, a driving-shaft, a planer for cleaning the ice, a cutting-tool for severing it transversely into sections, a swinging frame supporting said tool, and a feeder operated from the main shaft for moving strips of ice in a channel toward the planer, substantially as described.

9. In an ice-harvesting machine, the combination of a stationary frame, a driving-shaft, a planer, a cutting-tool for severing the ice transversely into sections and in line with the planer, a laterally-movable shaft supporting said tool, and a feeder operated from the main shaft for moving strips of ice in a channel toward the planer and cutting-tool, substantially as described.

In testimony whereof I affix my signature in presence of two witnesses.

JOSEPH A. MENGEL.

Witnesses:
S. A. TERRY,
D. C. REINOHL.